(12) United States Patent
Child et al.

(10) Patent No.: US 6,968,702 B2
(45) Date of Patent: Nov. 29, 2005

(54) NOZZLE BOLTING ARRANGEMENT FOR A TURBINE

(75) Inventors: Malcolm S. Child, South Berwick, ME (US); Andrew J. Olsen, Amesbury, MA (US)

(73) Assignee: Ingersoll-Rand Energy Systems Corporation, Portsmouth, NH (US)

( * ) Notice: Subject to any disclaimer, the term of this patent is extended or adjusted under 35 U.S.C. 154(b) by 0 days.

(21) Appl. No.: 10/730,155

(22) Filed: Dec. 8, 2003

(65) Prior Publication Data

US 2005/0120701 A1    Jun. 9, 2005

(51) Int. Cl.$^7$ ................................. F02C 7/20
(52) U.S. Cl. ................. 60/798; 29/889.22; 415/159
(58) Field of Search ............... 415/160, 193, 415/194, 159; 60/798, 799; 29/889.21, 889.22

(56) References Cited

U.S. PATENT DOCUMENTS 3,030,072 A * 4/1962 Boyd ........................ 415/164
3,455,331 A * 7/1969 Schurenberg et al. .. 137/601.05
6,164,903 A * 12/2000 Kouris ....................... 415/135

* cited by examiner

Primary Examiner—Ehud Gartenberg
(74) Attorney, Agent, or Firm—Michael Best & Friedrich LLP (57) ABSTRACT

A radial flow turbine including a rotor having a plurality of vanes defining an inlet, an outlet, and a flow path therebetween. A shroud is positioned to cover at least a portion of the flow path and a housing is positioned to at least partially support the rotor for rotation about a rotational axis. The housing at least partially defines a chamber for the receipt of a flow of products of combustion. A plurality of nozzle guide vane assemblies are positioned to provide fluid communication between the chamber and the inlet. Each of the plurality of nozzle guide vane assemblies is positioned adjacent another nozzle guide vane assembly to at least partially define one of a plurality of converging flow paths. Each nozzle guide vane assembly includes a guide vane positioned between the shroud and the housing and including an aperture therethrough. A bolt engages with the shroud and extends through the aperture to sandwich the guide vane between the shroud and the housing. A resilient member having a stiffness less than the bolt cooperates with the bolt to apply a compressive force to the guide vane.

19 Claims, 7 Drawing Sheets

NOZZLE BOLTING ARRANGEMENT FOR A TURBINE

BACKGROUND

The present invention relates to a system for supporting a turbine nozzle. More particularly, the present invention relates to a system for supporting a turbine nozzle that accommodates thermal expansion.

Microturbine engines are relatively small and efficient sources of power. Microturbines can be used to generate electricity and/or to power auxiliary equipment such as pumps or compressors. When used to generate electricity, microturbines can be used independent of the utility grid or synchronized to the utility grid. In general, microturbine engines are limited to applications requiring 2 megawatts (MW) of power or less. However, some applications larger than 2 MWs may utilize a microturbine engine.

Many microturbine engines include inlet guide vanes arranged to define a turbine inlet nozzle. The inlet guide vanes are subjected to a flow of hot gas that induces thermal expansion. Generally, the inlet guide vanes are rigidly supported such that the thermal expansion produces a significant thermal stress within the guide vanes. To accommodate the thermal stress, the inlet guide vanes include relatively thick trailing edges. In addition, the vanes are subject to more frequent periodic inspection, maintenance and eventual replacement.

SUMMARY

The present invention generally provides a turbine including a rotor having a plurality of vanes defining an inlet, an outlet, and a flow path therebetween. A shroud is positioned to cover at least a portion of the flow path and a housing is positioned to at least partially support the rotor for rotation about a rotational axis. The housing at least partially defines a chamber for the receipt of a flow of products of combustion. A plurality of nozzle guide vane assemblies are positioned to provide fluid communication between the chamber and the inlet. Each of the plurality of nozzle guide vane assemblies is positioned adjacent another nozzle guide vane assembly to at least partially define one of a plurality of converging flow paths. Each nozzle guide vane assembly includes a guide vane positioned between the shroud and the housing and including an aperture therethrough. A bolt engages with the shroud and extends through the aperture to sandwich the guide vane between the shroud and the housing. A resilient member having a stiffness less than the bolt cooperates with the bolt to apply a compressive force to the guide vane.

In another aspect, the invention generally provides a microturbine engine including a compressor creating a flow of compressed air, a recuperator preheating the flow of compressed air, and a combustor section mixing the preheated compressed air with a fuel and combusting the mixture to create a flow of products of combustion. A radial flow turbine having turbine blades is supported for rotation about a longitudinal axis. A turbine shroud at least partially surround the turbine and a scroll case at least partially surrounds the turbine shroud. The engine also includes a support member and an inlet defined between the support member and the turbine shroud and communicating between the inside of the scroll case and the inside of the turbine shroud. A plurality of inlet guide vanes are positioned in the inlet and adapted to direct fluid flow to impinge upon the turbine blades. The engine also includes a plurality of resilient members and a plurality of bolts. Each bolt includes a bolt head and extends through the turbine shroud, one of the guide vanes, the support member, and one of the resilient members. A nut threads onto each bolt to trap the turbine shroud, guide vanes, support member, and resilient member in a gap defined between the nut and the bolt head. The products of combustion enter the scroll case in a direction substantially perpendicular to the longitudinal axis of the turbine. The products of combustion enter the inlet, cause the turbine to rotate, and exit the turbine shroud as a flow of exhaust gas in a direction generally parallel with the longitudinal axis of the turbine. The guide vanes, turbine, and turbine shroud expand in response to being heated by the products of combustion. The resilient members deflect to at least partially accommodate such thermal expansion. The flow of exhaust gas flows through the recuperator to preheat the compressed air.

In yet another aspect, the present invention generally provides a method of assembling a radial flow turbine to accommodating differential thermal growth of a nozzle guide vane of the radial flow turbine, the method includes supporting a turbine rotor in a turbine housing for rotation about a rotational axis, the turbine rotor defining an inlet, an outlet, and a flow path therebetween. The method also includes positioning a shroud adjacent the flow path, the shroud cooperating with the housing to at least partially define a chamber for the receipt of a flow of products of combustion. The method further includes arranging a plurality of nozzle guide vanes to define a plurality of converging flow paths to provide fluid communication between the chamber and the inlet. The method also includes tensioning a plurality of bolts, each bolt corresponding with one of the nozzle guide vanes to sandwich each of the plurality of nozzle guide vanes between the shroud and the housing. The method further includes positioning a plurality of resilient members, each resilient member corresponding with one of the bolts such that each of the plurality of bolts compresses the corresponding resilient member and the resilient member applies a compressive force to the corresponding nozzle guide vane.

BRIEF DESCRIPTION OF THE DRAWINGS

The description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings. In addition, the terms "connected" and "coupled" and variations thereof are not restricted to physical or mechanical connections or couplings.

DETAILED DESCRIPTION

Figure 1:
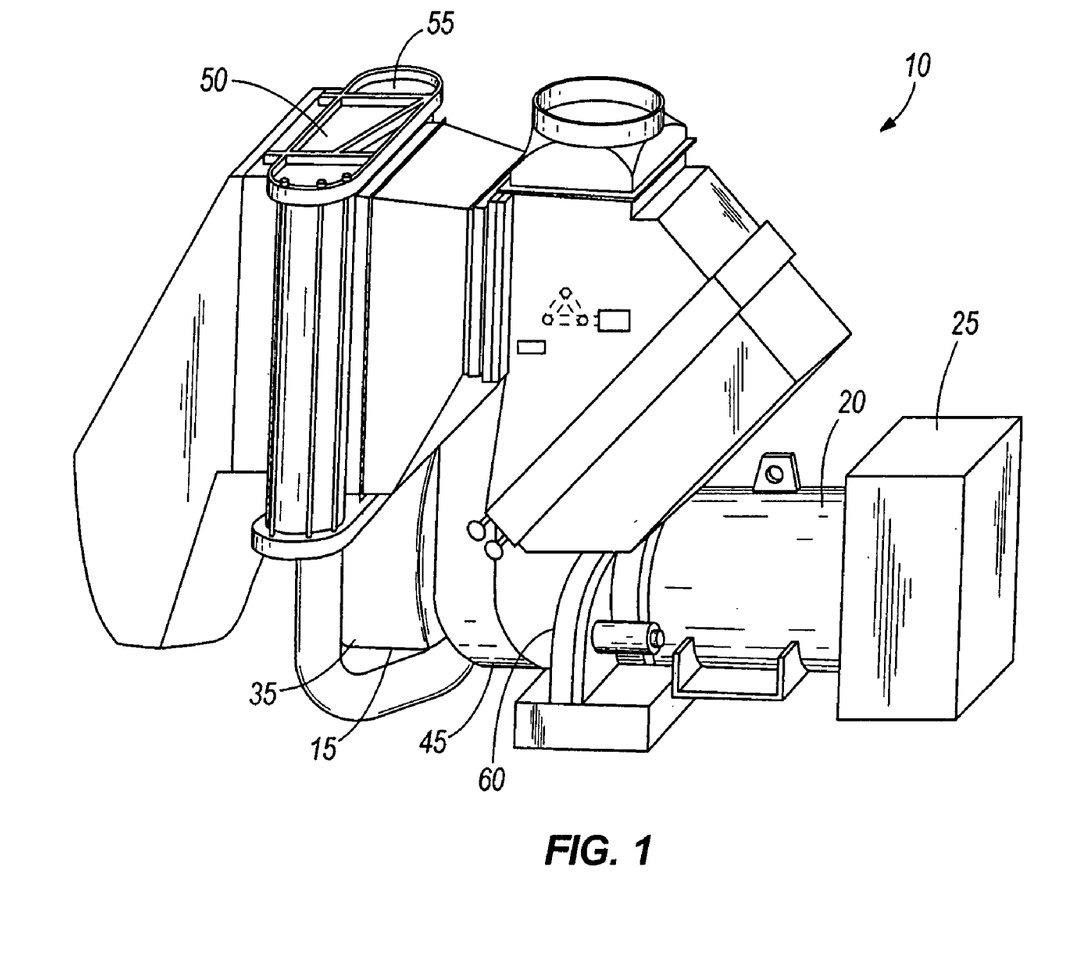
FIG. 1 is a perspective view of a portion of a microturbine engine.

With reference to FIG. 1, a microturbine engine system 10 that includes a turbine section 15, a generator section 20, and a control system 25 is illustrated. The turbine section 15 includes a radial flow turbine 35, a compressor 45, a recuperator 50, and a combustor 55. The recuperator 50 may be of the plate-fin variety with the combustor 55 in the inlet manifold as disclosed in U.S. Pat. No. 5,450,724, the entire contents of which is incorporated herein by reference.

The engine 10 includes a standard Brayton cycle combustion turbine with the recuperator 50 added to improve engine efficiency. The engine shown is a single-spool engine (one set of rotating elements). However, multi-spool engines are also contemplated by the invention. The compressor 45 is a centrifugal-type compressor having a compressor rotor 56 that rotates in response to operation of the turbine 35. The compressor 45 shown is a single-stage compressor. However, multi-stage compressors can be employed where a higher pressure ratio is desired. Alternatively, compressors of different designs (e.g., axial-flow compressors, reciprocating compressors, and the like) can be employed to supply compressed air to the engine.

The turbine 35 is a radial flow single-stage turbine having a turbine rotor 57 directly coupled to the compressor rotor 56. In other constructions, multi-stage turbines or other types of turbines may be employed. The coupled rotors 56, 57 of the turbine 35 and the compressor 45 engage the generator section 20 through a gearbox 60.

The recuperator 50 includes a heat exchanger employed to transfer heat from a hot fluid to the relatively cool compressed air leaving the compressor 45. One suitable recuperator 50 is described in U.S. Pat. No. 5,983,992 fully incorporated herein by reference. The recuperator 50 includes a plurality of heat exchange cells stacked on top of one another to define flow paths therebetween. The cool compressed air flows within the individual cells, while a flow of hot exhaust gas passes between the heat exchange cells.

During operation of the microturbine engine system 10, the compressor rotor 56 rotates in response to rotation of the turbine rotor 57. The compressor 45 draws in atmospheric air and increases its pressure. The high-pressure air exits the air compressor 45 and flows to the recuperator 50.

The flow of compressed air, now preheated within the recuperator 50, flows to the combustor 55 as a flow of preheated air. The preheated air mixes with a supply of fuel within the combustor 55 and is combusted to produce a flow of products of combustion. The use of a recuperator 50 to preheat the air allows for the use of less fuel to reach the desired temperature within the flow of products of combustion, thereby improving engine efficiency.

The flow of products of combustion enters the turbine 35 and transfers thermal and kinetic energy to the turbine 35. The energy transfer results in rotation of the turbine rotor 57 and a drop in the temperature of the products of combustion. The energy transfer allows the turbine 35 to drive both the compressor 45 and the generator 20. The products of combustion exit the turbine 35 as a first exhaust gas flow.

In constructions that employ a second turbine, the first turbine 35 drives only the compressor, while the second turbine drives the generator 20 or any other device to be driven. The second turbine receives the first exhaust flow, rotates in response to the flow of exhaust gas therethrough, and discharges a second exhaust flow.

The first exhaust flow, or second exhaust flow in two turbine engines, enters the flow areas between the heat exchange cells of the recuperator 50 and transfers excess heat energy to the flow of compressed air. The exhaust gas then exits the recuperator 50 and is discharged to the atmosphere, processed, or further used as desired (e.g., cogeneration using a second heat exchanger).

Figure 2:
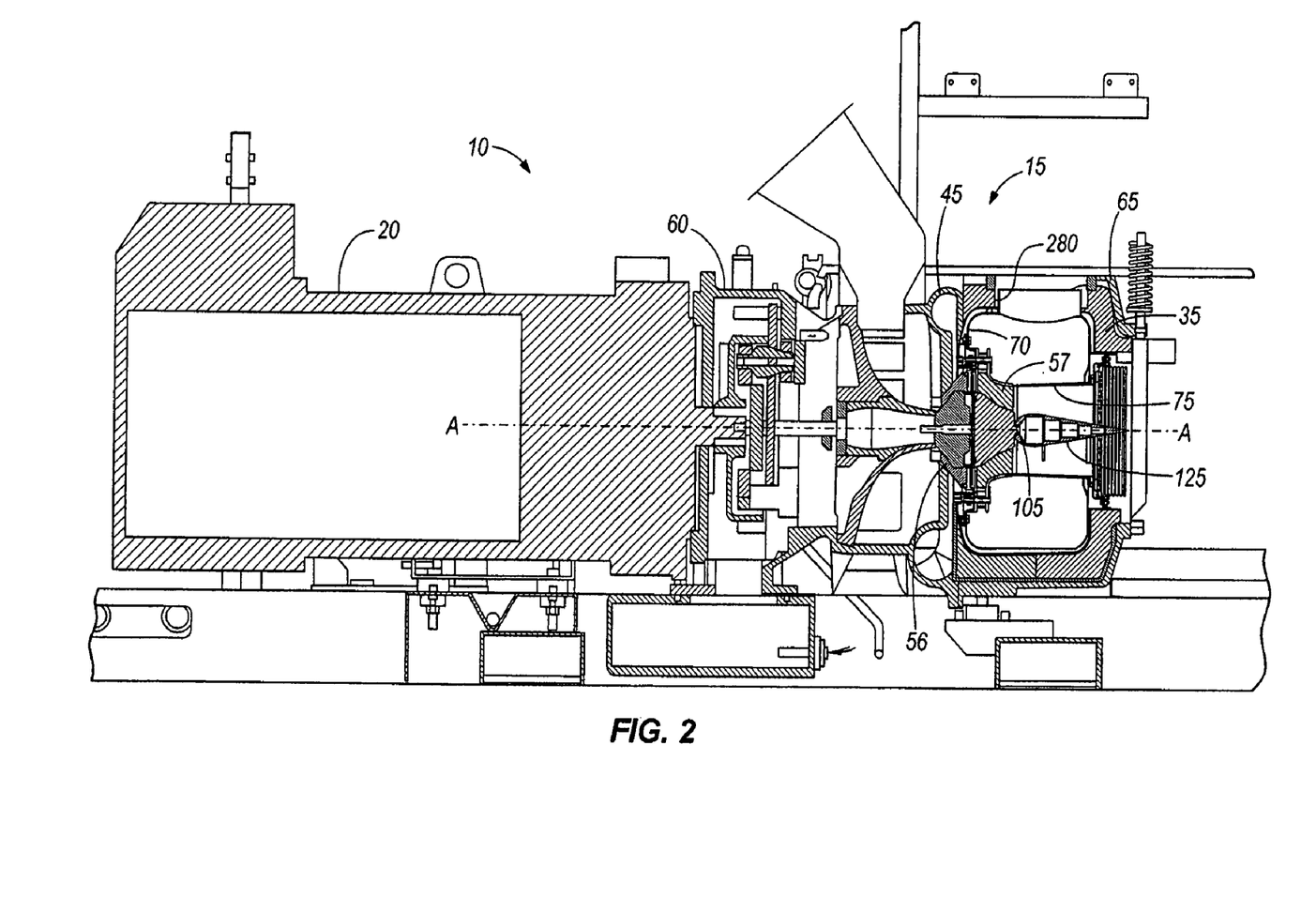
FIG. 2 is a sectional view of the turbine-compressor-generator portion of the engine of FIG. 1.

Turning to FIG. 2, the portion of the engine of FIG. 1 that includes the generator 20, the turbine 35, the compressor 45, and the gearbox 60 is illustrated. The components are arranged and coupled to one another such that the turbine 35, the compressor 45, and the generator 20 rotate on a common axis A—A. In other constructions, the generator 20 may be offset such that it rotates on an axis different from that of the turbine 35 and the compressor 45.

Figure 3:
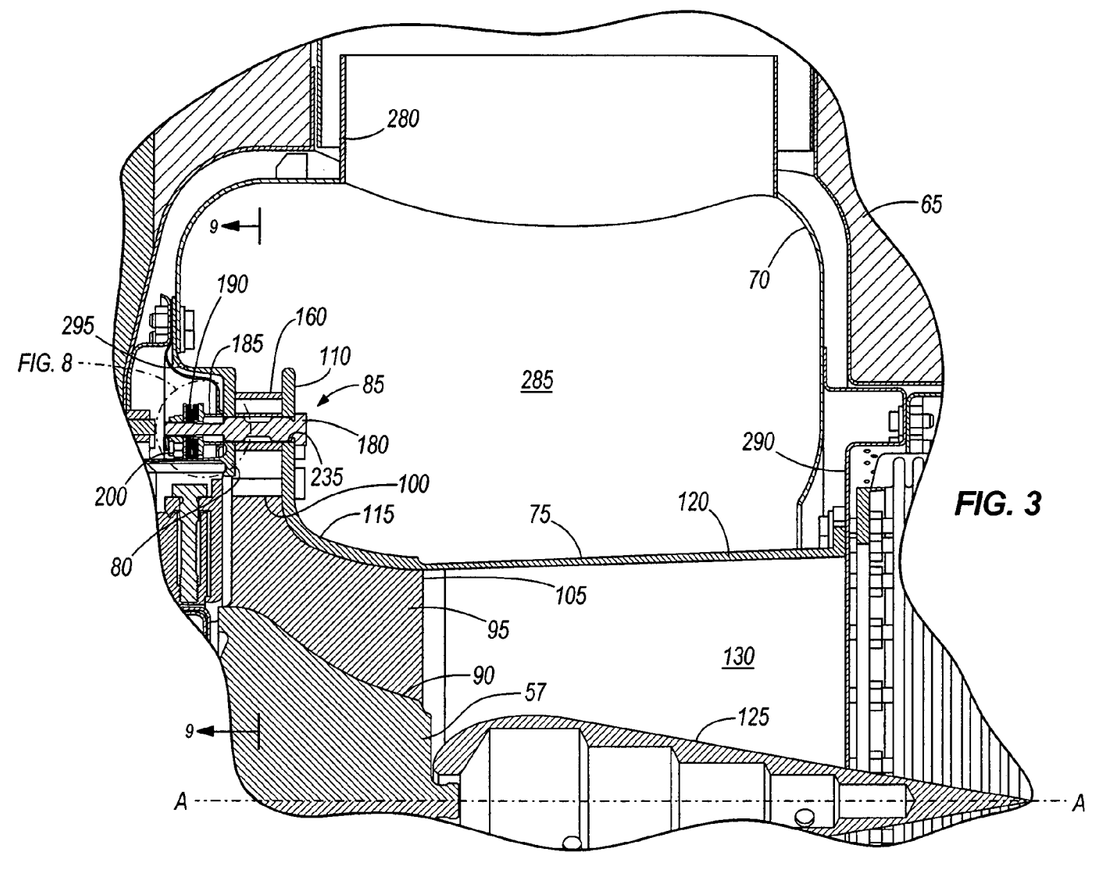
FIG. 3 is an enlarged view of a portion of the turbine portion.

The turbine 35, better illustrated in FIG. 3, includes the turbine rotor 57, a turbine housing 65, a scroll 70, a shroud 75, a nozzle guide vane support 80, and a plurality of nozzle guide vane assemblies 85. The turbine rotor 57 includes a rotor body 90 that supports a plurality of rotor fins 95. In most constructions, the rotor body 90 and the rotor fins 95 are manufactured from a single piece of material. However, other constructions may employ rotor fins 95 that attach to a rotor body 90 (e.g., welded, hook and root arrangements, and the like). The rotor fins 95 are positioned to define an inlet end 100 and an outlet end 105. The inlet end 100 receives the flow of products of combustion adjacent the largest diameter of the rotor 57. The fins 95 guide and redirect the flow of products of combustion along the length of the rotor 57. The flow is then discharged from the outlet end 105 of the rotor 57 along paths that are substantially parallel to the rotational axis A—A.

The shroud 75 includes an inlet portion 110, an arcuate portion 115, and a diffuser portion 120. The arcuate portion 115 is disposed adjacent the outer diameter of the rotor fins 95 and closely follows the contour defined by the outer diameter of the rotor fins 95. Thus, the shroud 75 cooperates with the rotor body 90 to substantially enclose the flow paths defined between adjacent rotor fins 95 and extending between the rotor inlet end 100 and the rotor outlet end 105. With the shroud 75 in the desired position, the products of combustion are generally forced to follow the flow paths defined between adjacent fins 95 with little leakage (as compared to the flow through the paths) escaping.

A diffuser cone 125 positioned along the rotational axis A—A downstream of the turbine outlet end 105 cooperates with the diffuser portion 120 of the shroud 75 to at least partially define a diffuser 130. The diffuser walls gradually diverge from one another to efficiently decelerate the exhaust gas exiting the flow paths between adjacent fins 95. In some engines, an additional diffuser portion attaches to the turbine 35 and further reduces the flow velocity of the exhaust gas.

Figure 4:
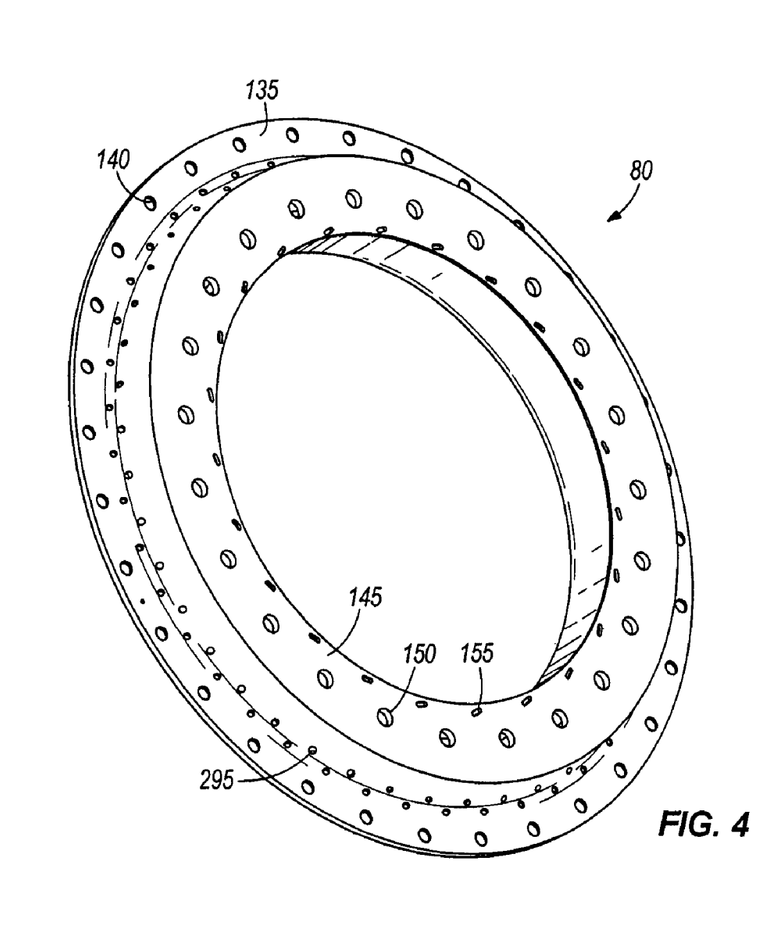
FIG. 4 is a perspective view of a nozzle guide vane support.

The nozzle guide vane (NGV) support 80, illustrated in FIG. 4, is coupled to the turbine housing 65. The NGV support 80 includes a first planar surface 135 that is substantially perpendicular to the rotational axis A—A and includes a plurality of apertures 140. The NGV support 80 also includes a second planar surface 145 that is substantially parallel to the first planar surface 135. The second planar surface 145 includes a plurality of circular apertures 150 and a plurality of oval or rectangular apertures 155.

Figure 8:
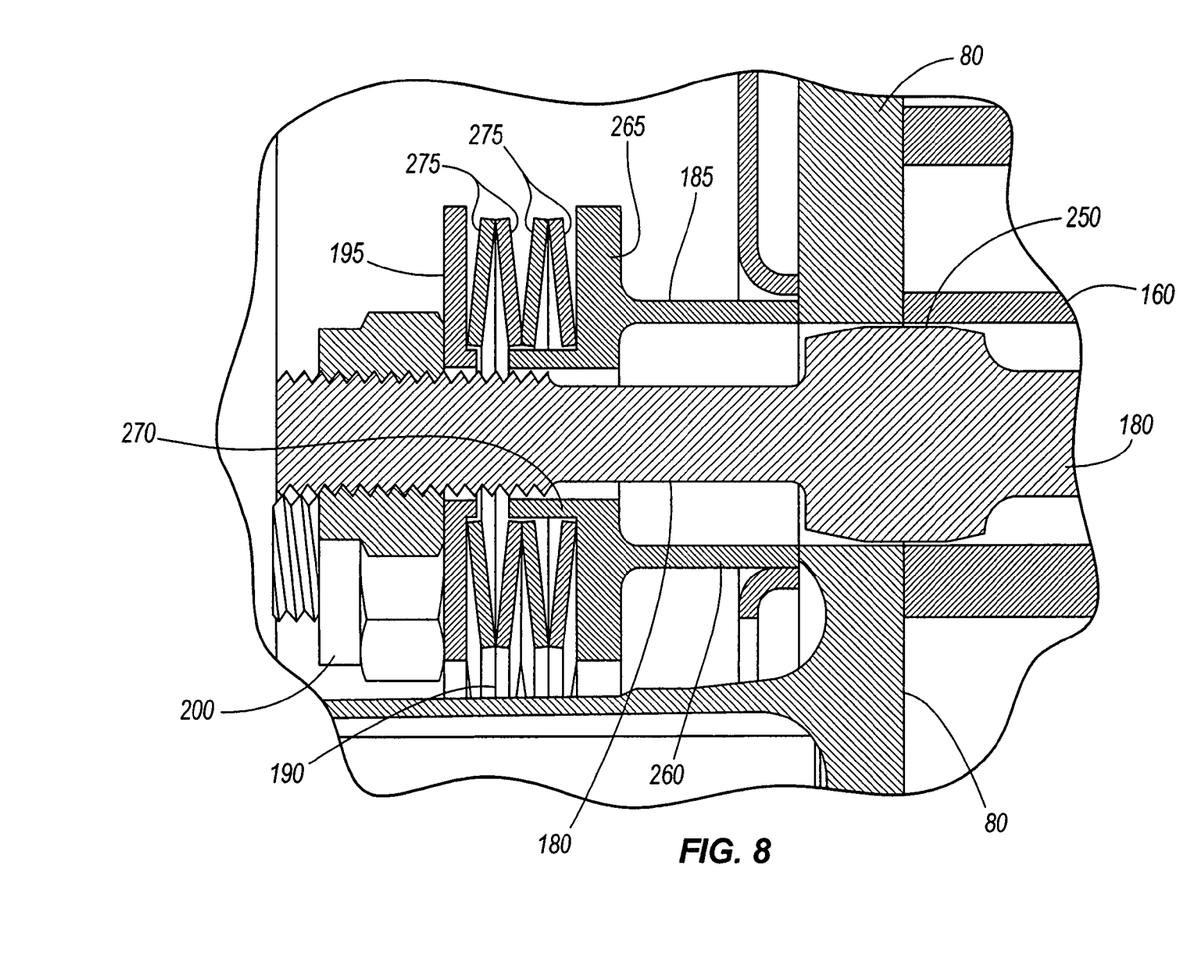
FIG. 8 is an enlarged section view of a nozzle guide vane assembly of FIG. 3.
Figure 9:
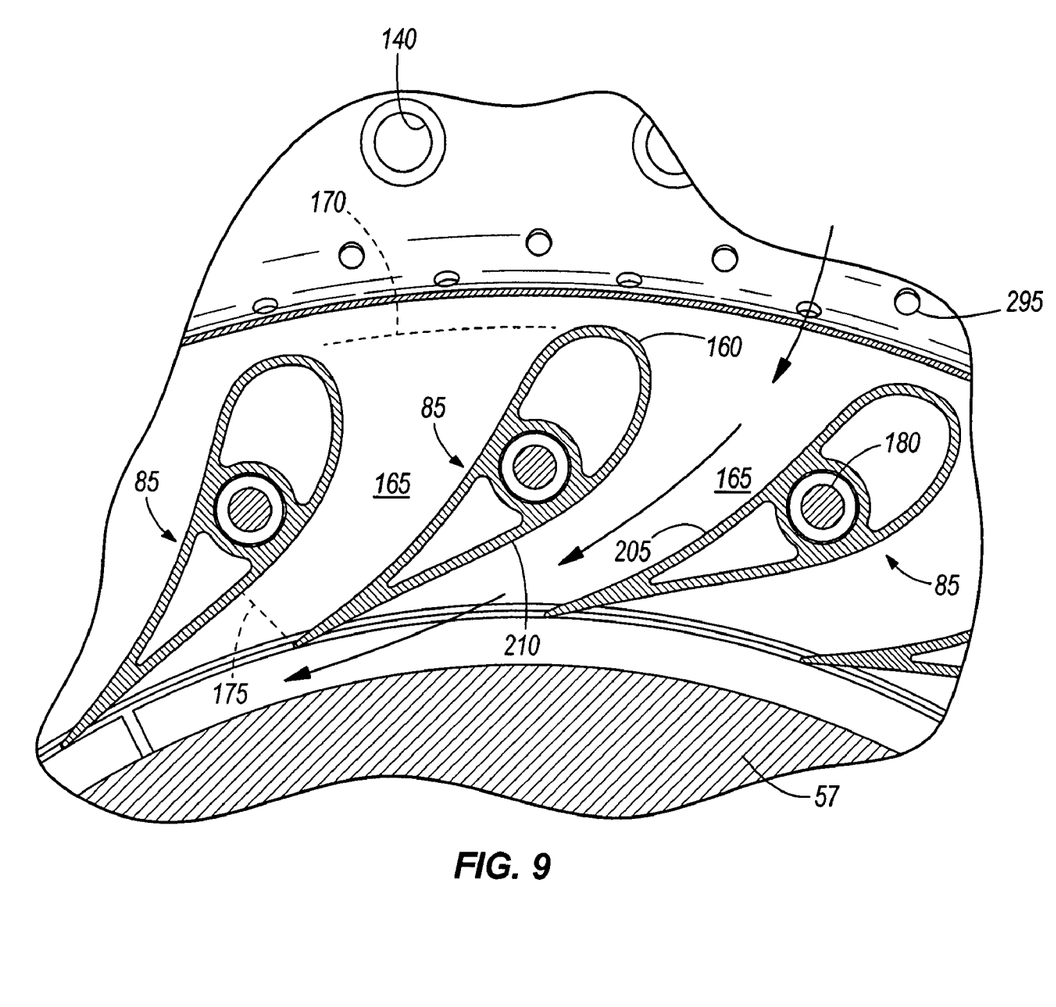
FIG. 9 is a section view of a portion of the nozzle guide vane assembly taken along line 9—9 of FIG. 3.

Each of the nozzle guide vane (NGV) assemblies 85, one of which is illustrated in FIGS. 3 and 8, includes a vane 160. The vanes 160 are arranged to define converging flow paths 165, or nozzles, (shown in FIG. 9) that have an inlet 170 and an outlet 175. The flow of products of combustion enter the converging flow paths 165 at the inlet 170. As the flow proceeds through the converging flow path 165, the shrinking flow area accelerates and redirects the flow such that the flow has a radial flow component and a tangential flow component relative to a stationary turbine rotor 57. The vanes 160 are positioned to define converging flow paths 165 oriented such that the flow exiting the outlet 175 of the flow paths is moving in a substantially radial direction relative to the turbine rotor 57 when the rotor 57 is at its normal operating speed. The construction illustrated herein establishes a converging nozzle. Other constructions may define converging-diverging nozzles to achieve higher flow velocities.

Figure 5:
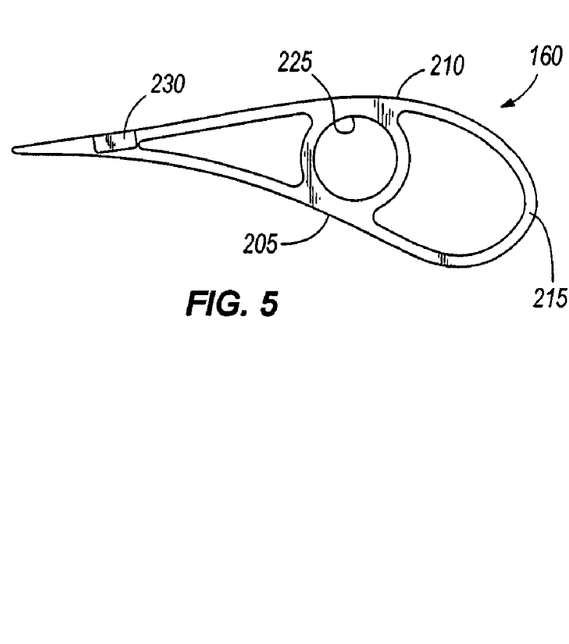
FIG. 5 is an end view of a nozzle guide vane.
Figure 6:
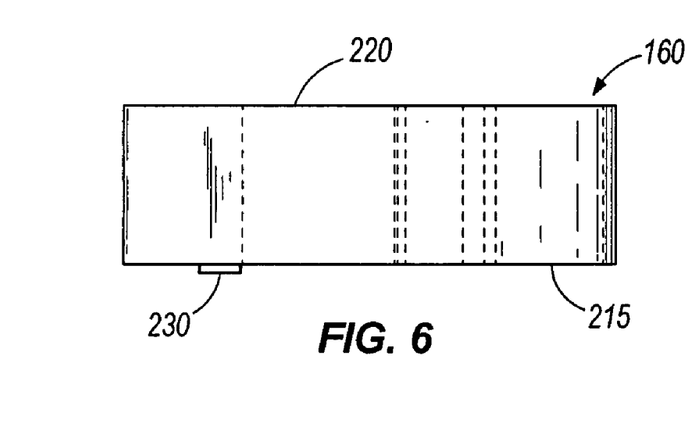
FIG. 6 is a side view of the nozzle guide vane of FIG. 5.

Each nozzle guide vane assembly 85 includes the vane 160, a bolt 180, a bushing 185, a resilient member 190, a washer 195, and a nut 200. The vane 160, illustrated in FIGS. 5 and 6, is an aerodynamic member having a pressure side 205 and a suction side 210. Each vane 160 cooperates with the adjacent vanes 160 such that one pressure side 205 is disposed opposite one suction side 210 to define one of the converging flow paths 165 therebetween. In most cases, each vane 160 at least partially defines two flow paths 165. Each vane 160 also includes a first planar surface 215, a second planar surface 220, an aperture 225 that extends from the first planar surface 215 to the second planar surface 220, and a key member 230. As shown in FIG. 5, the key member 230 includes a substantially rectangular protrusion that extends from the first planar surface 215. Of course, other constructions may employ other shapes (e.g., square, triangular, oval, polygonal, and the like) to define key members 230.

The vanes 160 are positioned between the inlet portion 110 of the shroud 75 and the second planar surface 145 of the NGV support 80. The first planar surface 215 of each vane 165 engages the second planar surface 145 such that the key member 230 engages the oval aperture 155 and the vane aperture 225 aligns with the circular aperture 150. With the vane aperture 225 and circular aperture 150 aligned and the key member 230 engaged with the oval aperture 155 the position and the orientation of each vane 165 is substantially fixed relative to the remaining vanes 165. One of ordinary skill will realize that the oval aperture 155 must be shaped to receive the key member 230 no matter the shape of the key member 230. As such, the actual shape of the oval aperture 155 may vary greatly.

The second planar surface 220 of each vane 165 engages the inlet portion 110 of the shroud 75. The inlet portion 110 includes a plurality of circular apertures 235 that align with each vane aperture 225. In this way, a continuous circular aperture extends through the inlet portion 110 of the shroud 75, the vane 115, and the NGV support 80.

Figure 7:
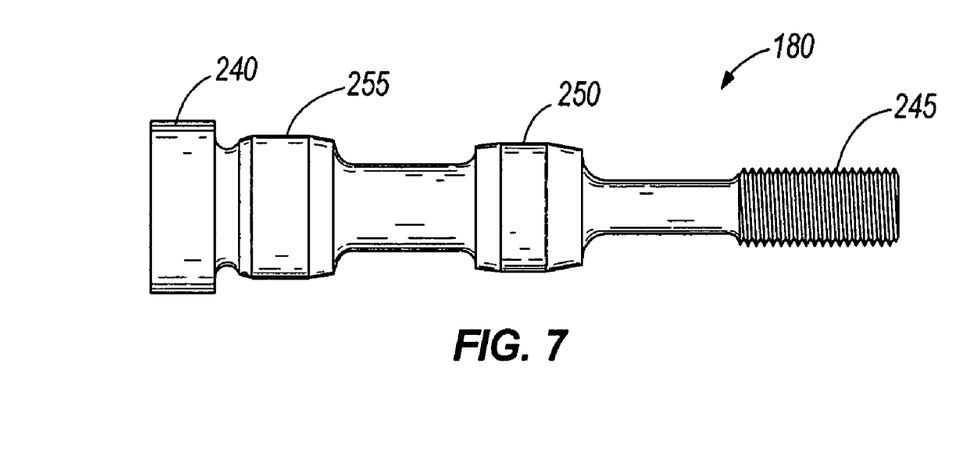
FIG. 7 is a side view of a bolt.

The bolt 180, illustrated in FIG. 7, includes a head 240 at one end and a threaded portion 245 at the opposite end. Between the head 240 and the threaded portion 245 are two dowel portions 250, 255 that have a diameter larger than the threaded portion 245 of the bolt 180. The bolt 180 is sized to pass through the continuous circular aperture such that the head 240 engages the inlet portion 110 of the shroud 75 and the threaded portion 245 extends beyond the circular aperture 150 of the NGV support 80. The first dowel portion 250 is spaced a distance from the head 240 such that the dowel 250 aligns with the interface between the nozzle guide vane support 80 and the first planar surface 215 of the vane 165. The second dowel portion 255 is spaced a distance from the head 240 such that the dowel 255 aligns with the interface between the inlet portion 110 of the shroud 75 and the second planar surface 220 of the vane 165. The dowel portions 250, 255 thus cooperate with the key member 230 and the oval aperture 155 to maintain the vane 165 in proper alignment and in the proper position relative to the other vanes 165 and the turbine rotor 57.

With reference to FIG. 8, the arrangement of the remainder of one of the NGV assemblies 85 is better illustrated. The bushing 185 includes a standoff portion 260, a support portion 265, and a guide portion 270. The guide portion 270 defines a bore that receives the bolt 180 and substantially aligns the bushing 185 along the axial centerline of the bolt 180. The stand-off portion 260 engages the NGV support 80 and spaces the support portion 265 a distance from the NGV support 80. The support portion 265 defines a planar surface that supports the resilient member 190.

The construction illustrated in FIG. 8 employs a plurality of Bellville washers 275 stacked on top of one another to define the resilient member 190. Other constructions may employ other components as the resilient member 190 (e.g., coil spring, leaf spring, solid compressible material, and the like). However, Bellville washers 275 are well suited to the present application for several reasons. The washers 275 can be easily manufactured from materials well suited to the high-temperature environment. Furthermore, the thickness of the washers 275 can be varied to vary the spring stiffness of the resilient member 190. In addition, more or less washers 275 can be used to easily increase or decrease the length of the resilient member 190 if necessary.

To complete each NGV assembly 85 the washer 195 is placed over the bolt 180 such that the washer 195 engages the final Bellville washer 275 and the nut 200 is threaded onto the bolt 180. The nut 200 is a self-locking nut that will not easily loosen during operation of the engine 10. In other constructions, other locking means such as lock washers, pins, jam nuts, tie wires, grub screws, and the like are used to assure that the nut 200 does not loosen during engine operation.

The scroll 70 includes a relatively thin-walled housing that defines an inlet 280 positioned to receive the flow of products of combustion from the combustor and direct that flow to the nozzle guide vane assemblies 85. The scroll 70 cooperates with the shroud 75 to at least partially define an annular chamber 285 that surrounds the diffuser 130 and the turbine rotor 55. The products of combustion enter the annular chamber 285 within the scroll 70 and are then directed through the nozzle guide vane assemblies 85 and the turbine rotor 57.

A support leg 290 disposed adjacent an outlet end of the scroll 70 supports one end of the scroll 70. The support leg 290 is formed as part of the scroll 70 or attached to the scroll 70 (e.g., welded, riveted, bolted, and the like) to support the outlet end. The support leg 290 also attaches to the shroud 75 and is flexible enough to move in response to forces created by differential temperature and pressure conditions that arise during engine operation. Any differential growth between the shroud 75 and the scroll 70 is accommodated by deflection of the scroll 70, and particularly the support leg 290, rather than an increase in stress within the components 70, 75. The opposite end of the scroll 70 engages the first planar surface 135 of the NGV support 80 to complete the annular chamber 285. Thus, the NGV assembly 85, the shroud 75, the scroll 70, and the NGV support 80 cooperate to define the substantially enclosed annular chamber 285 with only one significant outlet. The one significant outlet directs flow through the nozzle guide vane assemblies 85 and the turbine rotor 57. It should be noted that the components that make up the annular chamber 285 do not provide an air tight or a pressure tight chamber. As such, hot products of combustion pass through portions of the annular chamber 285 including the area around the NGV assemblies 85. In fact, some constructions may provide apertures 295 through the NGV support 80 to direct cooling air from the space between the NGV support 80 and the turbine housing 65. As such, all of the components described herein may be subjected to high temperatures during engine operation.

To assemble the components of the turbine 35, the vanes 160 are positioned between the shroud 75 and the NGV support 80 such that the key members 230 engage the oval apertures 155. The bolts 180 are then inserted through the shroud 75, the vanes 160, the NGV support 80, the bushings 185, the resilient members 190, and the washers 195. The nuts 200 are then threaded onto the bolts 180 to establish a compressive force approximately equal to the product of the spring constant of the resilient members 190 and the deflection of the resilient members 190. The compressive force is applied to the shroud 75 and the NGV support 80 to compress and retain the nozzle guide vanes 160. The scroll 70 is then bolted to the NGV support 80 and the shroud 75. It should be noted that the foregoing description of the assembly process should not be read as limiting the device to assembly in the order described as different constructions may be assembled in different orders.

In operation, the combustor 55 supplies the flow of products of combustion to the annular chamber 285. The products of combustion typically have a temperature in excess of 1200 degrees F. during normal operation, with higher or lower temperatures being possible. As such, the components exposed to this flow are preferably manufactured from suitable high-temperature alloys (e.g., Hastelloy X, Inconel, nickel-based alloys, and the like). In addition, the components are subjected to large and rapid temperature changes that induce thermal expansion that, if not accounted for, can cause high stress and damage to the components of the turbine 35.

The products of combustion within the annular chamber 285 are directed through the converging flow paths 165 defined by the plurality of nozzle guide vanes 160. The converging flow paths 165 accelerate the flow, which has the effect of increasing the heat transfer between the flow and the vanes 160. As such, the flow of products of combustion through the flow paths quickly heats the vanes 160 until they substantially match the temperature of the products of combustion. This rapid temperature increase causes rapid thermal expansion of the vanes 160. However, the bolts 180 disposed within the guide vanes 160 are substantially isolated from the flow of products of combustion. As such, the bolts 180 heat more slowly. This, along with any material variations (i.e., different materials having different coefficients of thermal expansion) results in differing thermal expansion between the components 160, 180.

As the vanes 160 expand in the axial direction, they push the shroud 75 in the axial direction toward the outlet of the turbine 35. This axial movement is accommodated by the deflection of the support leg 290 of the scroll 70. Movement of the shroud 75 also causes a movement of the position of the head 240 of the bolt 180. This movement is accommodated by further compression of the resilient member 190. Thus, the vanes 160 are free to expand in the axial direction with only a slight increase in the compressive force applied by the bolt 180. The increased force is substantially equal to the product of the amount of thermal expansion and the spring constant (i.e., the stiffness) of the resilient member 190.

In previous nozzle guide vane assemblies, the vanes were rigidly supported and could not freely expand. Thus, the thermal expansion produced a large compressive force in the vanes. In some cases, this compressive force could result in vane cracking that would require a more robust vane or would shorten the life of the vanes.

The present invention allows for the use of thinner vanes 160, which improve the efficiency of the nozzle, while still extending the operational life of the nozzle guide vane assemblies 85.

It should be noted that operation of the present system was described during a rapid heating event. However, it should be understood that the present system accommodates rapid shrinkage that may occur during sudden cooling events (e.g., rapid load reductions). As such, the invention should not be limited to applications that are subjected to only rapid heating events.

Although the invention has been described in detail with reference to certain preferred embodiments, variations and modifications exist within the scope and spirit of the invention as described and defined in the following claims.

What is claimed is:

1. A microturbine engine comprising:
   a compressor creating a flow of compressed air;
   a recuperator preheating the flow of compressed air;
   a combustor section mixing the preheated compressed air with a fuel and combusting the mixture to create a flow of products of combustion;
   a radial flow turbine having turbine blades and supported for rotation about a longitudinal axis;
   a turbine shroud surrounding the turbine;
   a scroll case surrounding the turbine shroud;
   a support member;
   an inlet defined between the support member and the turbine shroud and communicating between the inside of the scroll case and the inside of the turbine shroud;
   a plurality of inlet guide vanes in the inlet and adapted to direct fluid flow to impinge upon the turbine blades;
   a plurality of resilient members;
   a plurality of bolts each having a bolt head and a first dowel portion and a second dowel portion, and each extending through the turbine shroud, one of the guide vanes, the support member, and one of the resilient members, said first dowel portion engaging said one of said guide vanes and said turbine support member, and said second dowel portion engaging said one of said guide vanes and said shroud; and
   a nut threaded onto each bolt to trap the turbine shroud, guide vanes, support member, and resilient member in a gap defined between the nut and the bolt head;
   wherein the products of combustion enter the scroll case in a direction substantially perpendicular to the longitudinal axis of the turbine;
   wherein the products of combustion enter the inlet, cause the turbine to rotate, and exit the turbine shroud as a flow of exhaust gas in a direction generally parallel with the longitudinal axis of the turbine;

wherein the guide vanes, turbine, and turbine shroud expand in response to being heated by the products of combustion;
wherein the resilient members deflect to at least partially accommodate such thermal expansion; and
wherein the flow of exhaust gas flows through the recuperator to preheat the compressed air.

2. The engine of claim 1, wherein the resilient member includes a compression spring around the bolt and between the nut and the support member.

3. The engine of claim 1, wherein the resilient member includes a plurality of Bellville washers around the bolt and between the nut and the support member.

4. The engine of claim 1, wherein the nut is tightened on the bolt to preload the resilient member with a compressive force and to preload the bolt with a tensile force.

5. The engine of claim 1, wherein during ordinary operation of the engine the resilient member accommodates sufficient thermal expansion to prevent the bolt from reaching its elastic limit.

6. The engine of claim 1, wherein the bolts are arranged in a generally circular pattern substantially centered about the longitudinal axis of the turbine.

7. The engine of claim 6, wherein the turbine shroud includes a generally conical section having a longitudinal axis substantially colinear with the turbine longitudinal axis, and a lip extending generally perpendicular to the longitudinal axis and defining a ring through which the bolts pass generally parallel to the longitudinal axis.

8. The engine of claim 1, further comprising an antirotation interface between each inlet guide vane and the support member to resist rotation of the inlet guide vane about the bolt.

9. The engine of claim 8, wherein the antirotation interface includes a protrusion on the each inlet guide vane and a recess in the support member into which each protrusion is received.

10. A radial flow turbine comprising:
a rotor including a plurality of vanes defining an inlet, an outlet, and a flow path therebetween;
a shroud positioned to cover at least a portion of the flow path;
a housing positioned to at least partially support the rotor for rotation about a rotational axis, the housing at least partially defining a chamber for the receipt of a flow of products of combustion; and
a plurality of nozzle guide vane assemblies positioned to provide fluid communication between the chamber and the inlet, each of the plurality of nozzle guide vane assemblies positioned adjacent another nozzle guide vane assembly to at least partially define one of a plurality of converging flow paths, each nozzle guide vane assembly including:
a guide vane positioned between the shroud and the housing and including an aperture therethrough;
a bolt engaged with the shroud and extending through the aperture to sandwich the guide vane between the shroud and the housing, wherein the bolt includes a first dowel portion and a second dowel portion and wherein the first dowel portion is sized to engage the guide vane and the housing and the second dowel is sized to engage the guide vane and the shroud to position the guide vane; and
a resilient member having a stiffness less than the bolt and cooperating with the bolt to apply a compressive force to the guide vane.

11. The radial flow turbine of claim 10, wherein the shroud includes an inlet portion that is substantially perpendicular to the rotational axis, the inlet portion adapted to engage the guide vanes.

12. The radial flow turbine of claim 10, wherein the housing includes a support member and a scroll, the support member, the scroll, and the shroud cooperating to at least partially define the chamber.

13. The radial flow turbine of claim 10, wherein the guide vanes are sandwiched between the support member and the shroud.

14. The radial flow turbine of claim 10, wherein the resilient member includes a spring.

15. The radial flow turbine of claim 10, wherein the resilient member includes a plurality of Bellville washers arranged to define a spring.

16. The radial flow turbine of claim 10, wherein the resilient member is disposed between a nut threaded to the end of the bolt and the housing, and wherein the bolt compresses the resilient member to apply the compressive force to the guide vane.

17. A method of assembling a radial flow turbine to accommodating differential thermal growth of a nozzle guide vane of the radial flow turbine, the method comprising:
supporting a turbine rotor in a turbine housing for rotation about a rotational axis, the turbine rotor defining an inlet, an outlet, and a flow path therebetween;
positioning a shroud adjacent the flow path, the shroud cooperating with the housing to at least partially define a chamber for the receipt of a flow of products of combustion;
arranging a plurality of nozzle guide vanes to define a plurality of converging flow paths to provide fluid communication between the chamber and the inlet;
tensioning a plurality of bolts, each bolt corresponding with one of the nozzle guide vanes to sandwich each of the plurality of nozzle guide vanes between the shroud and the housing, each of said bolts engaging said one of said nozzle guide vanes and said housing with a first dowel portion, and said one of said nozzle guide vanes and said shroud with second dowel portion respectively; and
positioning a plurality of resilient members, each resilient member corresponding with one of the bolts such that each of the plurality of bolts compresses the corresponding resilient member and the resilient member applies a compressive force to the corresponding nozzle guide vane.

18. The method of claim 17, wherein the positioning step further comprises arranging a plurality of Bellville washers on the bolt to at least partially define the resilient member.

19. The method of claim 17, further comprising heating the guide vanes with the flow of products of combustion such that the guide vanes thermally expand, and further compressing the resilient member in response to the thermal expansion of the guide vanes.

* * * * *